United States Patent
Melandso et al.

(10) Patent No.: US 6,782,750 B1
(45) Date of Patent: Aug. 31, 2004

(54) DEVICE FOR HIDDEN CODING OF AN OBJECT AND METHOD FOR READING

(76) Inventors: Terje Melandso, Granheim, Brumunddal (NO), 2380; Frank Melandso, Blaklokkevn. 6, Kvaloysletta (NO), 9100

(*) Notice: Subject to any disclaimer, the term of this patent is extended or adjusted under 35 U.S.C. 154(b) by 0 days.

(21) Appl. No.: 10/110,940
(22) PCT Filed: Jul. 18, 2000
(86) PCT No.: PCT/NO00/00241
§ 371 (c)(1), (2), (4) Date: Apr. 18, 2002
(87) PCT Pub. No.: WO01/29754
PCT Pub. Date: Apr. 26, 2001

(30) Foreign Application Priority Data

Oct. 19, 1999 (NO) .................................. 995098

(51) Int. Cl.⁷ ............................................ G01N 29/12
(52) U.S. Cl. ........................................................ 73/579
(58) Field of Search ........................... 73/597, 598, 599, 73/602, 432.1, 579

(56) References Cited

U.S. PATENT DOCUMENTS

| | | | | |
|---|---|---|---|---|
| 5,464,973 A | * | 11/1995 | Despres ....................... | 235/494 |
| 5,552,778 A | * | 9/1996 | Schrott et al. ............. | 340/10.4 |
| 5,563,583 A | * | 10/1996 | Brady et al. ............. | 340/572.2 |
| 5,565,847 A | * | 10/1996 | Gambino et al. ......... | 340/572.6 |
| 5,734,332 A | * | 3/1998 | Kirknes .................... | 340/10.31 |
| 5,883,575 A | * | 3/1999 | Ruby et al. ............... | 340/572.5 |

FOREIGN PATENT DOCUMENTS

| | | | | |
|---|---|---|---|---|
| DE | 4020752 A1 | * | 10/1991 | ............ G06K/7/10 |
| EP | 0460733 A1 | | 12/1991 | |

OTHER PUBLICATIONS

JP 4115387 A (Nippon Electric Ind Co Ltd) Aug. 10, 1992 (abstract).

* cited by examiner

Primary Examiner—Hezron Williams
Assistant Examiner—Rose M. Miller
(74) Attorney, Agent, or Firm—Nixon & Vanderhye PC

(57) ABSTRACT

A device for coding an object where the codes themselves are in the foam of milled holes/indentation, and a method for reading the codes where the object with a code is placed under an ultrasound sender and receiver respectively. The holes/indentations (3') are provided in the object itself or on a material which is attached to the object, as the holes/indentations (3') are facing away from the object, and the holes/indentations (3') are covered by or filled with a material respectively. This material may be a thin film (2') in the size range of 0,1–3 mm or made by a surface treatment in the form of varnish/paint, plastic, laminate, wood or metal. The code may be devised in a material, i.e. thin film being attached to the object and covered and thus hidden. The codes may be made by milling or stamping on the material of the object or on the material attached to the object. The ultrasound sender unit is devised to send waves or a pulsed wave, forming standing waves, as the wave length $L_d$ satisfies the relation $a=(n/2) L_d$ where a is the thickness of the material hiding the code so that the wave which hits areas without holes becomes resonant, or the wave length where $a+da=(n/2) L_d$, where da is the depth of the hole so that the wave hitting the area with indentations/holes becomes resonant.

14 Claims, 1 Drawing Sheet

DEVICE FOR HIDDEN CODING OF AN OBJECT AND METHOD FOR READING

This application is the U.S. national phase of international application PCT/NO00/00241 filed 18 Jul. 2000, which designated the U.S.

Present invention relates to a method for reading the codes, as well as a method for creating for hidden coding on an object.

At the present several methods are known for automatic collecting of data, as barcode, radio frequency identification and data communications, magnet strips and OCR-systems.

In the last years it is developed two dimensional codes in addition to linear bar codes. One such code is Data Matrix, which is a public available and accepted digital code and which is specially used within the electronics, pharmacy, and car industry. The codes may be printed, written by ink jet printers or stamped in a product. By a video camera system the code may be read and interpreted. Partially advanced image processing routines and illuminations techniques have to be applied to secure an interpretation of the codes which are impressed on the product.

In many application cases it may be desired to hide the codes, e.g. in data collection as a part of computerized, integrated production where the surface is worked on current production process. The possibility to be able to document the origin, condition of production, and secure the quality is important for many manufacturers, which is provided by marking a product in order to track and/or retrieve the above mentioned information. In order to accomplish this is a hidden code desirable, which not create visible marks on the product and therefore do not disappear by working the surface and thus makes it possible to obtain information about a product and where in addition is obtained assurance against pirate copied products as a such marking, which may be encrypted, will be difficult to copy.

The code may be created in the material and covered by normal surface finishing, as varnish/painting, plastic, laminate, wood or metal. The code may be stamped from the material, eventually represented by a thin film which is attached to the material and covered and thereby hidden.

The code may according to present invention be read by means of ultrasound. EP 0 460 733 A1 corresponding to Norwegian paten application no. 1991 2084 describes a system for marking and then especially devices in connection with oil well boring. The system is comprised of an identification plate comprising a number of holes, indentations and the like, where these is extending partly through the plate. The holes/indentations may be formed in a two dimensional data code similar to the Data Matrix code. This plate is mounted on the utility which is intended to be marked in such a way that the surface of the plate comprising said holes/indentations is hidden. Marks in form of holes/indentations is read by means of ultrasound.

The herby known system used principal for reading codes uses, however, a principal which maybe compared with a wave focusing which have strong demand to the wavelength in respect of the thickness of the covering and dimension of the holes/indentations and which therefore do not make the method especially well suited for working on the surface as the changes may lead to reduction of the thickness of the cover by the working of the surface, which may result in that the chosen wavelength comes out of focus and thereby may a diffraction of the reflected waves arise which make a detection of the holes/indentations impossible.

Said hiding of the codes are however not very appropriate by a product where the objects aesthetic outlook is of importance as the attachment of a plate to a product will be associated with a substantial interference in the outer of a product if a such device not shall be visible, e.g. will it be necessary with a milling of a cavity in the product corresponding to the plate with the code and thereafter processing of the welding seams by welding of the plate to the product, thus a work intensive process.

The present invention is intended to avoid the above mentioned drawbacks and in addition render possible creation of the hidden code as part of the normal processing of a product, which is provided by means of a method for reading the codes, as well as a method for creating hidden coding on an object.

In the following, the invention will be described in greater detail with reference to the drawings, in which.

Figure 1:
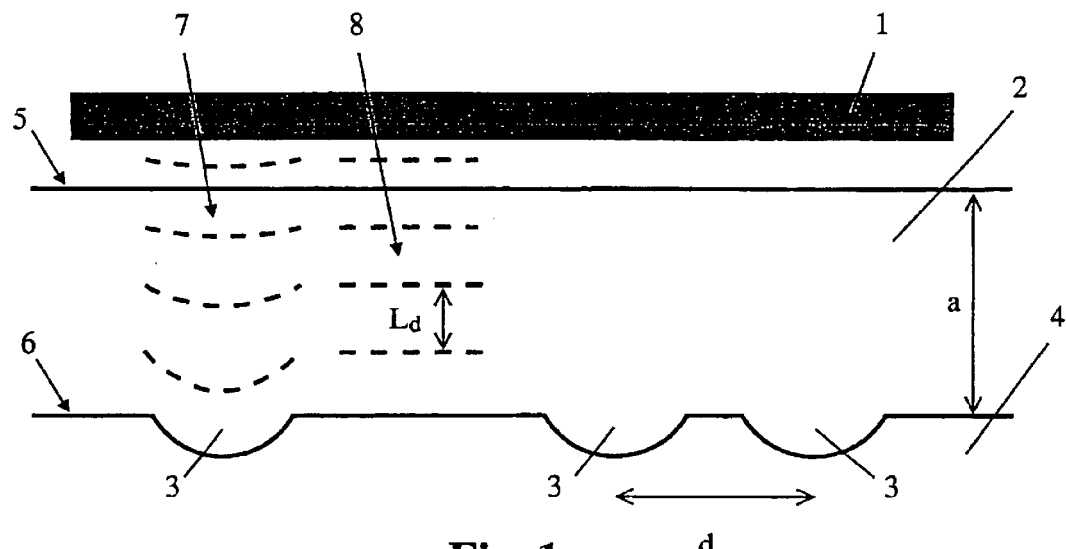
FIG. 1 shows a principal example of reading the code by using wave focus as shown earlier known.

It is used a two dimensional (2D) transducer 1, 1' which is function as combined transmitter and receiver in order to read hidden codes in form of milled hole/indentations 3, 3' in the material 4, 4', which is covered of a thin film (a=0,1–3 mm) 2 of e.g. a plastic material. The transducer 1, 1' may be constructed as a matrix of N×N elements whereby the reflected signals into every element may be read individually.

The transducers 1, 1' transmit a plane wave where the wave front is anticipated to arrive parallel to the cover lay 2, 2'. This wave may be a monochromatic (a frequency) wave, a modulated wave or impulse of a certain duration in respect of time.

At the interface between the different media will a part of the ultrasound be reflected is due to differences in the material characteristic and density. This is the case for both interface air/cover lay 5, 5' and between cover lay and material 6, 6' in which the code is imbedded by e.g. milling 3, 3'.

FIG. 1 shows a possible embodiment of the principal with wave focusing where the code is formed in the material 4 by milling ball-shaped indentation 3 as binary codes. The curve of the milling is chosen such that the reflected wave has its focal point adjacent to transducers 1 surface. Due to the focusing of the reflected wave from the hole (binary 1) the transducer will register a stronger signal here than in a region which is plane (binary 0). The wave front reflected from a hole and a plane face respectively is suggested in FIG. 1 with the reference number 7 and 8. The distance between the binary code points and the thickness a of the protecting material are shown by d and a, respectivly in FIG. 1.

If the principle is going to function the wavelength $L_d$ (or impulse length by use of pulsed wave) have to be $\leq a$. The wavelength $L_d$ must in addition also be chosen smaller than both d and the size of the milled region. If above mentioned relation is not met, then diffraction of the reflected waves will probably make a detection of holes difficult.

Figure 2:
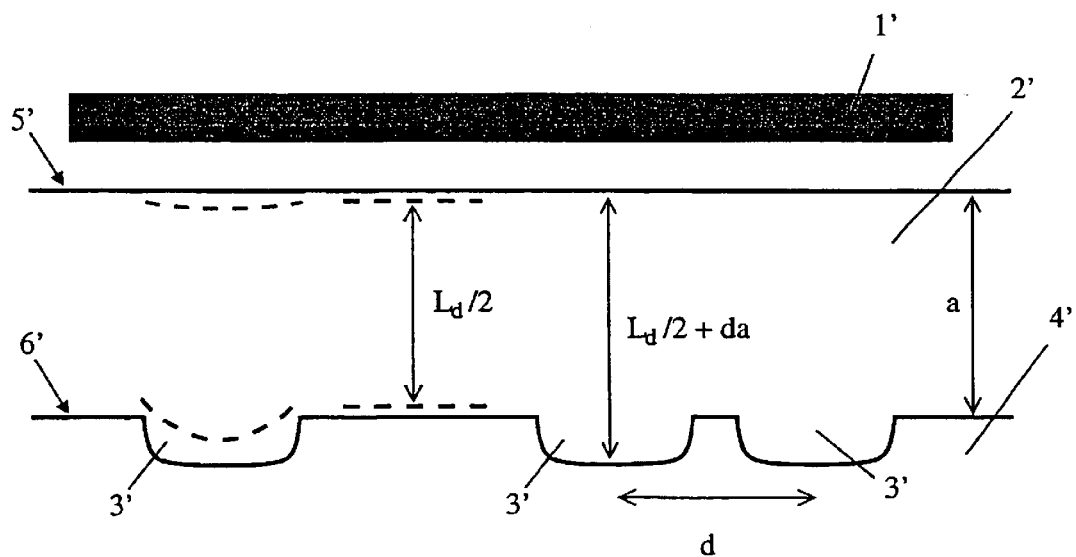
FIG. 2 shows a principal example of reading the code by using standing waves.

FIG. 2 shows a principal for reading hidden codes which is providing several advantages in respect of what is shown in FIG. 1 and partly known principles. In the principles shown in FIG. 2 is standing waves used, whereby it is not the sever demands on the shaping of the indentations as the case would be by the embodiment shown in FIG. 1.

The of holes/indentations 3' will, however, advantageously be shaped uniform as suggested in FIG. 2. These indentations may be replaced by a thin film of a material with density different from the material 6' shown in FIG. 2.

The frequency of the ultrasound source is varied until the wavelength $L_d$ satisfy approximate the relation $$a=(n/2)L_d,$$

where n is a natural number (n=0,1,2,3, . . . ) and a is the thickness of the protective material.

The wave which hit the region without holes will be resonant and therefore be amplified in relation to the wave which hit the recessed region shown in FIG. 2, as the figure shows the situations for n=1.

By increase the wavelength in such a way that $$a+da=(n/2)L_d$$

where da is the depth of the hole, will opposite effect occur. Both these resonance criteria may principally be used to read a hidden code as the reflected ultrasound is reduced or amplified in the region with indentations 3' in the material 4'.

What is claimed is:

1. Method for reading codes, comprising:

placing an object with a code covered by a cover material under an ultrasound sender and receiver unit, said ultrasound unit selectively sending waves or a pulsed wave, including providing said cover material in a thickness generally satisfying the relation a=(n/2) $L_d$ where n is a natural number (n=0,1,2,3 . . . ), a is the thickness of the cover material and $L_d$ is the wavelength of the ultrasound source, so that the wave which hits areas without said code forms standing waves within the cover material.

2. Method according to claim 1, wherein wavelength $L_d$ is equal to double the thickness a of the material covering the code.

3. Method according to claim 1, further comprising, before said placing, defining holes/indentations in said object to provide said code.

4. Method according to claim 1, further comprising, before said placing, defining said code by applying a thin film of material having a density different than a density of the covering material to said object and then covering the different density material with the covering material.

5. Method for reading codes, comprising:

defining holes/indentations in an object to provide a code, covering the code with a material of thickness a, placing the object with the covered code under an ultrasound sender and receiver unit, said ultrasound unit selectively sending waves or a pulsed wave, of wavelength $L_d$, wherein said wavelength $L_d$ satisfies the relation a+da= (n/2) $L_d$, where da is the depth of the holes/indentations so that the wave hitting the area with indentations/holes forms standing waves or becomes resonant.

6. Method for creating hidden codes on an object where the codes themselves are in the form of holes/indentations, comprising:

providing holes/indentations in the object itself or on a material which is attached to the object, the holes/ indentations opening away from the object, covering or filling the holes/indentations with a cover material respectively, whereby the holes/indentations can be read by placing the object under an ultrasound sender and receiver unit provided to send waves or a pulse wave to the object such that the sent wave forms standing waves or becomes resonant either in the presence of a hole/ indentation or in the absence of a hole/indentation.

7. Method according to claim 6, wherein said covering or filling the holes/indentations is with a cover material that is a thin film or is made by a surface treatment in the form of varnish/paint, plastic, laminate, wood or metal.

8. Method according to claim 6, wherein said covering or filling the holes/indentations is with a cover material that is a thin film of 0,1–3 mm thickness.

9. Method according to claim 6, wherein said code is provided in a thin film that is attached to the object, and covered by said cover material and thus hidden.

10. Method according to claim 6, comprising milling or stamping said codes on the material of the object or on the material attached to the object.

11. Method according to claim 6, wherein said providing comprises milling ball-shaped indentations as binary codes.

12. Method according to claim 11, wherein a curvature of said milled ball-shaped indentations is determined such that a reflective wave has a focal point adjacent to a surface of said ultrasound unit.

13. Method according to claim 11, wherein a distance between centers of said ball-shaped indentations is d, and a wavelength $L_d$ of the wave sent by the ultrasound unit is selected so that $L_d$<d and so that $L_d$ is less than the diameter of the milled hole.

14. Method according to claim 6, wherein a frequency of the sent waves is varied until the wavelength $L_d$ satisfies the relation a=(n/2) $L_d$ where n is a natural number and a thickness of the cover material.

* * * * *